United States Patent
Killoran, Jr.

(10) Patent No.: US 11,797,977 B2
(45) Date of Patent: Oct. 24, 2023

(54) EMAIL-BASED E-COMMERCE WITH NEAR FIELD COMMUNICATION

(71) Applicant: SWOOP IP HOLDINGS LLC, Wilmington, DE (US)

(72) Inventor: John P. Killoran, Jr., Albuquerque, NM (US)

(73) Assignee: SWOOP IP HOLDINGS LLC, Wilmington, DE (US)

( * ) Notice: Subject to any disclaimer, the term of this patent is extended or adjusted under 35 U.S.C. 154(b) by 0 days.

(21) Appl. No.: 17/987,040

(22) Filed: Nov. 15, 2022

(65) Prior Publication Data
US 2023/0073622 A1    Mar. 9, 2023

Related U.S. Application Data

(63) Continuation of application No. 15/009,652, filed on Jan. 28, 2016, now Pat. No. 11,551,198.

(60) Provisional application No. 62/108,870, filed on Jan. 28, 2015.

(51) Int. Cl.
| | | |
|---|---|---|
| G06Q 20/32 | (2012.01) | |
| G06Q 30/00 | (2023.01) | |
| G06Q 20/38 | (2012.01) | |
| G06Q 30/06 | (2023.01) | |
| G06Q 10/10 | (2023.01) | |

(52) U.S. Cl.
CPC ..... *G06Q 20/3278* (2013.01); *G06Q 20/3821* (2013.01); *G06Q 30/00* (2013.01); *G06Q 30/06* (2013.01); *G06Q 10/10* (2013.01)

(58) Field of Classification Search
CPC ..... G06Q 10/00–30; G06Q 20/00–425; G06Q 30/00–08
See application file for complete search history.

(56) References Cited

U.S. PATENT DOCUMENTS

| | | |
|---|---|---|
| 5,960,411 A | 9/1999 | Hartman |
| 6,101,485 A | 8/2000 | Fortenberry et al. |
| 6,167,435 A | 12/2000 | Druckenmiller et al. |
| 8,538,845 B2 | 9/2013 | Liberty |
| 8,606,703 B1 | 12/2013 | Dorsey et al. |
| 8,725,635 B2 | 5/2014 | Klein et al. |
| 8,762,272 B1 | 6/2014 | Cozens et al. |
| 9,189,785 B2 | 11/2015 | Liberty et al. |

(Continued)

OTHER PUBLICATIONS

Ron White, How Computers Work, Oct. 15, 2003, Que Publishing, 7th Ed, p. 4 (Year: 2003).

*Primary Examiner* — Mohammad A. Nilforoush
(74) *Attorney, Agent, or Firm* — Volpe Koenig

(57) ABSTRACT

A method and system implemented in an e-commerce system to facilitate transactions between a customer and a vendor is disclosed. The method includes generating, by a processor, the requested at least one NFC code and token, wherein the at least one NFC code and token an identification of the price the customer pays for a specific product, the customer's amount owed on an invoice or granting access to a secure account, transmitting, by a transmitter, the at least one NFC code and token to a vendor server; receiving, by a receiver, a response email, wherein the response email includes the token; decoding, by the processor, the token; performing, by the processor, an Sender Policy Framework (SPF) and DomainKeys Identified Mail (DKIM) validation; and processing, by the processor, the transaction, on a condition that the SPF and DKIM validations are approved.

13 Claims, 12 Drawing Sheets

(56) References Cited

U.S. PATENT DOCUMENTS

| | | |
|---|---|---|
| 9,208,488 B2 | 12/2015 | Liberty |
| 9,892,386 B2 | 2/2018 | Liberty |
| 10,395,223 B2 | 8/2019 | Muthu et al. |
| 10,515,345 B2 | 12/2019 | Koh et al. |
| 2005/0256802 A1 | 11/2005 | Ammermann |
| 2006/0253335 A1 | 11/2006 | Keena et al. |
| 2007/0255620 A1 | 11/2007 | Tumminaro et al. |
| 2008/0208762 A1 | 8/2008 | Arthur |
| 2009/0006233 A1 | 1/2009 | Chemtob |
| 2009/0282108 A1 | 11/2009 | Sachtjen |
| 2010/0070419 A1 | 3/2010 | Vadhri |
| 2012/0130898 A1 | 5/2012 | Snyder et al. |
| 2012/0253896 A1 | 10/2012 | Killoran, Jr. |
| 2013/0268372 A1 | 10/2013 | Jalili |
| 2013/0318348 A1 | 11/2013 | Lebron |
| 2014/0204415 A1 | 7/2014 | Sakai |
| 2016/0205549 A1 | 7/2016 | Hoyer |

FIG. 11

EMAIL-BASED E-COMMERCE WITH NEAR FIELD COMMUNICATION

CROSS REFERENCE TO RELATED APPLICATION

This application is a continuation of U.S. patent application Ser. No. 15/009,652 filed Jan. 28, 2016, which claims the benefit of U.S. provisional application No. 62/108,870 filed Jan. 28, 2015, which are incorporated by reference as if fully set forth.

FIELD OF INVENTION

The present invention is related to electronic commerce systems. More particularly, the present invention is a system and method that facilitates electronic commerce by using one or more forms of near field communication.

BACKGROUND

Within this technological climate, email still remains the bedrock technology for electronic messaging. Many use email in tandem with other networks and for more official correspondence. The vast majority of services, websites, SMS, social networks and online retailers require an email address as the basis for joining and confirming identity. Email is an underutilized tool that is generally considered only as a method to write messages and correspond with others, or as a way to advertise to potential customers. However, email has not developed into a seamless vehicle to sell products or to perform a financial transaction directly within the email message.

An e-commerce system is required to store multiple offers for customers. Each offer may have a corresponding long token. Each long token may be identified with another one or more tokens or short Uniform Resource Locator (URL) links. A system that can translate incoming tokens or URL links with the long token and identify the requested offer would provide greater flexibility and clarity for the customer and vendor messaging as well as payment processing and secure web logon.

Near Field Communication or NFC technology allows customers to use NFC chips embedded in devices to trigger functions on mobile devices. One use of NFC technology is as a trigger to drive online customers to a website that allows them to shop or pay for a purchase. This still requires the customer the cumbersome task of inputting a password and other information. A system that would integrate email based checkout with the NFC trigger would be welcome in the market place. Additionally NFC chips are used to trigger payments directly. This payment environment creates an inconsistent method for making transactions. A system and method that would enable the payments to be approved by email would consolidate and streamline the process for the consumer. A system that would allow vendors to encode NFC chips with email payment tokens and integrate the NFC function with the convenience and security of the @Pay Email Payment Gateway would be of great benefit to consumers and vendors alike.

NFC technology also allows the device to hold a value or act as a stand-in for the credit card. These values generally need to be replenished by either visiting another device that allows you to add value or through a URL login. A system that would allow you to add value via an email message rather than visiting a web address on a browser would be a welcome convenience by the consumer.

SUMMARY

Near Field Communication (NFC) and Radio Field Identification (RFID) is used in a wide variety of ways in marketing and security. NFC and RFID establish communication via radio, Bluetooth, and/or Wi-Fi between others with a variety of devices. NFC and RFID chips are used as readable points to access applications and responses on mobile devices both from marketers and peer to peer communication. NFC and RFID chips are also used to hold monetary amounts on cards and as credit cards. They are also used as security keys. Disclosed is a system and method integrating NFC and RFID chip functionality with an email based checkout.

A method and system implemented in an e-commerce system to facilitate transactions between a customer and a vendor is disclosed. The method includes generating, by a processor, the requested at least one NFC code and token, wherein the at least one NFC code and token include an identification of the price the customer pays for a specific product, the customer's amount owed on an invoice or granting access to a secure account; transmitting, by a transmitter, the at least one NFC code and token to a vendor server; receiving, by a receiver, a response email from a customer, wherein the response email includes the token; decoding, by the processor, the token; performing, by the processor, a Sender Policy Framework (SPF) and Domain-Keys Identified Mail (DKIM) validation; and processing, by the processor, the transaction, on a condition that the SPF and DKIM validations are approved.

BRIEF DESCRIPTION OF THE DRAWINGS

A more detailed understanding may be had from the following description, given by way of example in conjunction with the accompanying drawings wherein:

FIG. 11 is an example of the email offer message sent from the e-commerce system to the customer device.

DETAILED DESCRIPTION

Figure 1:
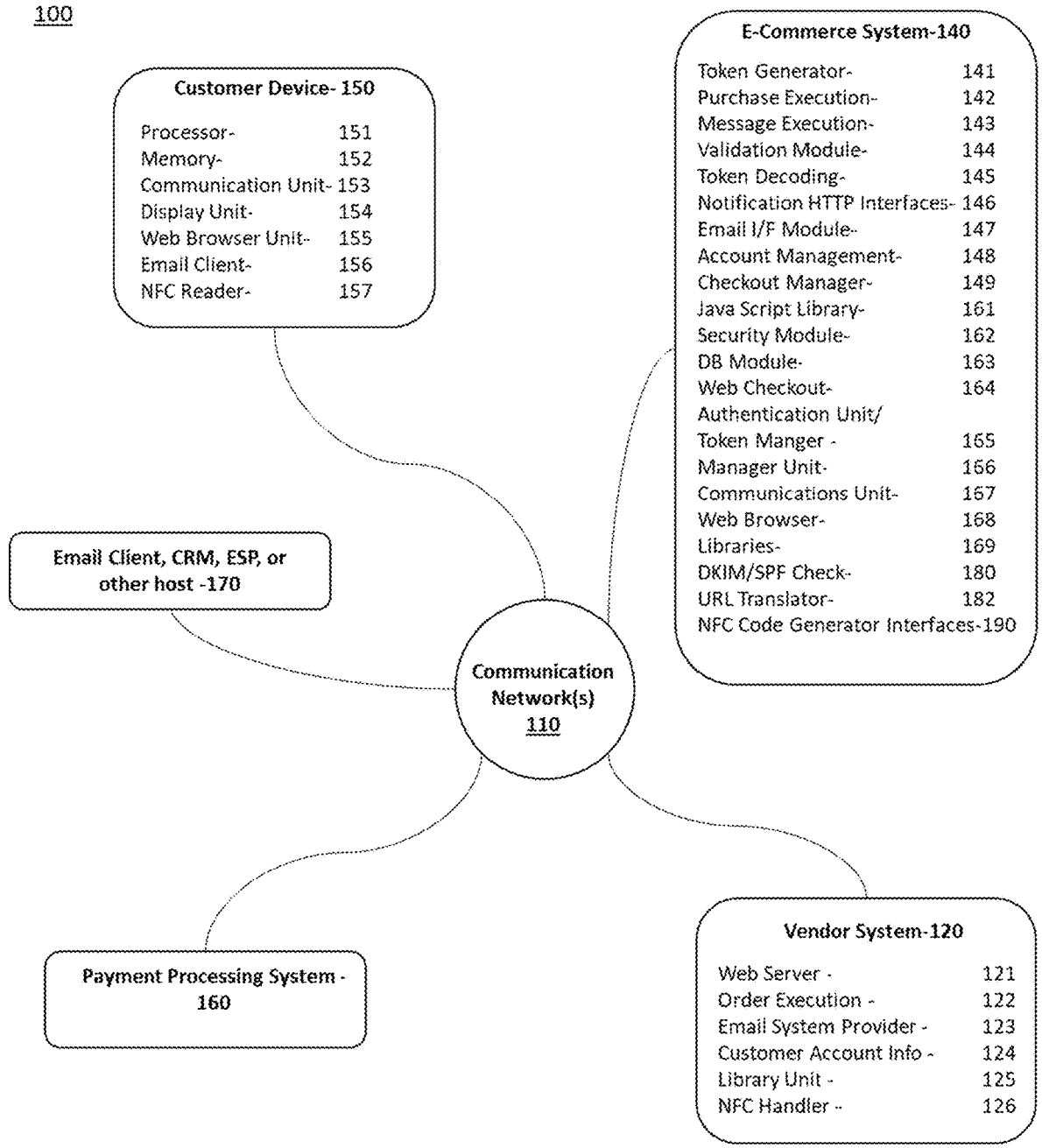
FIG. 1 illustrates a system diagram of an email-based website checkout system.

The embodiments described below may be used in tandem or in relation to specific vendor needs. They may also be integrated with an email service provider (ESP), customer relationship management (CRM) or directly with a payment processor. Payment processing may occur in a number of ways using multiple gateways, credit cards, debit cards, direct carrier billing and/or an automatic clearing house. Although the description below focuses on the use of email messaging, social media networks may also be substituted. The configuration of the system may vary based on client needs. However, for the purposes of this application FIG. 1 represents one possible configuration.

A method implemented in an e-commerce system to facilitate transactions between a customer and a vendor integrating an email based payment with Near Field Communication (NFC) is disclosed. The method includes receiving a request for at least one token for use in an NFC chip or device, generating the requested at least one token for use in an NFC chip or device, wherein the at least one token for use in an NFC or device includes at least an email field, transmitting the at least one token to a vendor server, receiving a response email, wherein the response email includes the token, decoding the token, performing authentication, and processing the transaction, on a condition that the authentication(s) are approved.

NFC chips are used for a wide variety of security aspects including door locks, credit cards and computers. The email payment gateway exploits the secure environment of the email client to authorize payments. @Pay's Email Payment Gateway allows the security of the email client to double for the online payment which allows charges to be placed on the customer's credit card. A system that would allow the customers devices to utilize the presence of an NFC credit card to open the email client or complete and online transaction would be desired by the consumer.

Many current websites have clunky multi-step checkout processes, which reduce conversions and increase shopping cart abandonment. While there are solutions that allow the functionality those vendors' want, these solutions have been hindered in their adoption rate because of integration difficulties. In previous solutions, the client was burdened with extensive setup that may take days if not weeks.

The methods and apparatus described herein provide a streamlined process of limited clicks. The present web checkout offers a minimum number of clicks thereby providing a feature that many businesses wish to offer to their customers. The described e-commerce system makes acquiring this feature a less burdensome process. It simplifies a complicated set-up process and it takes less time. While online shoppers have come to expect more streamlined checkout experience, integrating those innovations into a businesses' online infrastructure has not proven to be an easy or an accommodating process.

Currently, a vendor needs to generate a unique token on their systems in order to set up a minimum-of-clicks web checkout on their websites for their business. Minimum-of-clicks web checkout has been available through an e-commerce system's API with the use of a "site token"—a value generated by a vendor's server with a private key value known only to them (targeting an e-commerce system's public key), information about the desired transaction amount, and information about the customer's browser that is making the request to purchase. This information is encrypted, and when passed back to an e-commerce system's servers, decrypted using the e-commerce system's private key. After verifying that the browser information in the token matches the browser information the e-commerce system received from the payment request, the e-commerce system executes the transaction. This provides protection from a malicious alteration of the destination of funds by an attacker executing an XSS vulnerability against a vendor site, and protection from a rogue vendor, in that the transaction was executed on the e-commerce system by the request of the paying customer and not the request of the vendor. This existing process demands that a client needs to generate a unique token on their systems in order to set up a minimum-of-clicks service.

Implementing a minimum-of-clicks web checkout has proven to be challenging for some vendors that are unable or unwilling to incorporate a token generator into their systems. This may result from different coding language incompatibilities, system restrictions on external code, limited programming resources, or other internal factors. As a result, an alternative solution is necessary to ease implementation and increase the real availability of this functionality.

The methods and apparatus described herein allow for a secure minimum-of-clicks transaction, but while providing a more streamlined process for the host business providing the service to setup and integrate than in previous systems found in the industry. This method improves the URL-based checkout set-up process found throughout the e-commerce environment. This also improves email based transactions. The industry process typically requires that a client generates a unique token on their systems if they wish to provide their customers a minimum-of-clicks service. As described herein, tokens may be generated on the e-commerce system's servers. The methods and apparatus described herein provide new methods for checking out, donating or paying a bill.

The methods and apparatus described herein may also include a direct-to-purchase process that reduces the delay in purchasing products when shopping online. The use of shopping carts on e-commerce websites requires the customer to make the decision to purchase twice; first when they choose to put the product in the shopping cart and second when they decide to actually pay for the product, services or donations. With direct-to-purchase, the customer only makes the decision once. The customer may choose to buy the product once, and it is purchased and put in the bag. The direct-to-purchase provides a running total of money being spent and provides the option for the customer to "Cancel" individual line items. An image of a shopping bag appears in the corner of the web-page so the customer is provided with the information regarding the content of the shopping bag. When the transaction is submitted for processing may be determined by the merchant. The payment may be submitted at any point in the process or may occur automatically when the customer logs out.

FIG. 1 illustrates a system diagram of an Email-Based E-commerce System 100. The Email-Based E-commerce System 100 may integrate SMS and social media for online e-commerce. It describes the integration of investment portfolio management and bill payment. FIG. 1 shows an example system 100 that may be used for vendor token generation that may be used in e-commerce transactions.

The example system 100 includes a customer device 150, a vendor server 120, an e-commerce system 140, a banking server (not shown), a payment processing system 160, and an email service provider 170 that may communicate over one or more wired and/or wireless communication networks 110. The wired or wireless communication networks 110 may be public, private or a combination of public or private networks.

The customer device 150 may be, for example, a cellular phone, a smartphone, a desktop computer, a laptop computer, a tablet computer, or any other appropriate computing device. The customer device 150 may utilize short message service (SMS) messages, multimedia messaging service (MMS), social media apps, web browsing, and or email. For example, social media apps may include Facebook, Twitter, GooglePlus+, LinkedIn, Instagram, Pinterest, Swapchat, Tumblr, and the like. The customer device 150 includes a processor 151, memory 152, a communications unit 153, a display unit 154, a web browser unit 155, which may communicate data to/from the web server module(s) in the vendor server 120 and payment server 140, email client 156, and near field communication (NFC) reader 157. The web browser unit 155 may include and/or communicate with one or more sub-modules that perform functionality such as rendering HTML (including but not limited to HTML5), rendering raster and/or vector graphics, executing JAVASCRIPT, and/or rendering multimedia content.

Alternatively or additionally, the web browser unit 155 may implement Rich Internet Application (RIA) and/or multimedia technologies such as ADOBE FLASH and/or other technologies compatible with Internet based communications. The web browser unit 155 may implement RIA and/or multimedia technologies using one or web browser plug-in modules (e.g., ADOBE FLASH), and/or using one or more sub-modules within the web browser unit 155 itself. The web browser unit 155 may display data on one or more display devices (not depicted) that are included in, or connected to, the customer device 150, such as a liquid crystal display (LCD) display or monitor. The customer device 150 may receive an input from a user from an input device (not depicted) that is included in, or connected to, the customer device 150, such as a keyboard, a mouse, a microphone or a touch screen, and provide data that indicates the input to the web browser unit 155.

The vendor system 120 may include a web server 121, order execution unit 122, an email system provider 123, customer account info 124, a library unit 125, and an NFC handler 126. The vendor system may be substituted for a financial management system as illustrated in the examples described herein.

The web server 121 provides a website that may be accessed by a customer device 150. The web server 121 may implement HTTP protocol, and may communicate Hypertext Markup Language (HTML) pages and related data from the website to/from the customer device 150 using HTTP. The vendor server 120 may be connected to one or more private or public networks (such as the Internet), via which the web server 121 communicates with devices such as the customer device 150. The web server 121 may generate one or more web pages, may communicate the web pages to the customer device 150, and may receive responsive information from the customer device 150.

The web server 121 may be, for example, an NGINX server, an APACHE HTTP server, a SUN-ONE Web Server, a MICROSOFT INTERNET Information Services (IIS) server, and/or may be based on any other appropriate HTTP server technology. The vendor server 120 may also include one or more additional components or modules (not depicted), such as one or more load balancers, firewall devices, routers, switches, and devices that handle power backup and data redundancy.

The vendor system 120 may also include one or more additional components or modules (not depicted), such as one or more load balancers, firewall devices, routers, switches, and devices that handle power backup and data redundancy.

The order execution unit 122 is configured to receive instructions included in received messages and executes orders on behalf of the vendor system 130.

The memory may be configured to store information associated with e-commerce transactions. This may include inventory information, information used to generate web pages, customer information, and other e-commerce data.

The e-commerce system 140 may include a token generator 141, a purchase execution module 142, a message execution module 143, a validation module 144, a database module 163, a token decoder 145, a notification HTTP module 146, an email interface module 147, an account management unit 148, checkout manager 149, web checkout 164, JAVA script library 161, a security module 162, authentication unit/token manager 165, manager unit 166, communications unit 167, web browser 168, libraries 169, DKIM/SPF check 180, a Universal Resource Locator (URL) translator 181, and an NFC code generator interface 190. While only one vendor system 120 is shown communicating with the e-commerce system 140, this is shown as an example only. The e-commerce system 140 may communicate with an internal or external email service provider (ESP) 170 and an internal or external payment processing system 160. The e-commerce system 140 may communicate with multiple vendor systems 120.

Similarly, vendors may register with the e-commerce system 140. The e-commerce system 140 may provide the vendor system 120 with a public key and private key to be used in token transaction in accordance with the methods described herein. When a transaction is attempted (e.g. for invoices and payments), the e-commerce system 140 decodes the token, authenticates the sender of the email, which may allow the transaction to be processed. While the e-commerce system 140 is depicted as a separate entity in FIG. 1, this is shown as an example only. The e-commerce system 140 may be controlled and/or co-located with the vendor system 130, and/or the email service provider 170.

The token generator 141 may generate tokens for use in e-commerce transactions. Tokens may be encrypted or plain text strings which contain information to perform a transaction when sent to the e-commerce system 140. A token may be one or multiple encrypted strings, files, passwords, cyphers, plain text or other data which may contain information used to perform or authenticate a transaction. While FIG. 1 shows the token generator 141 as being a part of the e-commerce system 140, it may be hosted by any trusted party with access to the private key. For example, the banking server may include a token generator 141. A token may include one or more of the following parameters or other parameters not listed below:

Private-key: The private key provided by the e-commerce system 140.

Public-key: E-commerce system's 140 public key, provided by the e-commerce system 140.

Auth-key: Any additional data that may be used to authenticate the transaction, including, but not limited to, biometric identification, location data and other fraud detection systems.

Partner-id: The partner ID given provided by the e-commerce system 140.

Environment: The environment the vendor wants to generate buttons for. This distinguishes whether the token is being used in a testing environment or in the live environment (and running real transactions).

Type: The type of token to generate (e.g. bulk, email-targeted, etc.). There are multiple types of tokens that a token generator 141 may generate and decode. For example, site tokens may be used for website transactions, email tokens for minimum-of-clicks email payments, and universal tokens for email validations.

Card: The card token associated with the recipient of this token. When a customer is registered with the e-commerce system 140, the vendor receives a credit card token—a unique identifier that references the specific card associated with that customer and vendor. When the vendor is generating a token to submit to e-commerce system 140, they may include the card token as a customer identifier.

Email: The email associated with the receipt of this token.

URL: The Signup URL the recipient may go to if customer doesn't have payment information registered with e-commerce system 140.

Amount: The amount a customer should be charged for the transaction the token is generated for.

User-data: Data to pass back as a reference. This data may include custom data that the vendor may want to pass through the e-commerce system 140 and receive back when a transaction has completed. It may include an item reference number or SKU, customer address, or other piece of data that is not required by e-commerce system 140 to complete a transaction, but that the vendor wants associated with that transaction.

Expires: Expiration date for token, integer value of seconds since epoch.

Header-user-agent: The HTTP_USER_AGENT from the request header. HTTP headers are sent as part of a request from a customer's web browser unit within customer device 150 for a piece of information. These headers define the parameters that the web browser unit is expecting to get back. The user-agent is the identifier of the software that is submitting the request—typically the identifier of the web browser unit that is requesting the content.

Header-accept-language: The HTTP_ACCEPT_LANGUAGE from the request header. The accept-language is the acceptable language for the response—e.g. the language in which the web browser unit is requesting the content be sent back.

Header-accept-charset: The HTTP_ACCEPT_CHARSET from the request header. The accept-charset is the character sets that are acceptable for the response—e.g. the character set in which the web browser unit is requesting the content be sent back.

IP-address: The IP address of the token recipient.

In one example, a bulk token may omit the card and email fields, thereby allowing for the tokens to be shared. Additionally, or alternatively, a bulk token may include the card field and/or email field but the e-commerce system 140 may be configured to ignore those fields and/or other fields based on the type field.

The purchase execution module 142 facilitates the execution of payments between a customer and a vendor.

The message execution module 143 is configured to analyze received messages and communicate with the token decoder 145 to determine if the received message is valid and to identify the request embedded in the message (e.g. request for purchase of goods.) If the token decoder 145 indicates the token is valid, the message execution module 143 may then access the account management unit 148 to verify a transaction.

The database module 163 serves as a database to store information that may be accessed by the e-commerce system 140.

The token decoder 145 may be configured to decode tokens received from external sources, such as a vendor system 120 or a customer device 150.

The validation module 144 may serve to authenticate received emails, using the DomainKeys Identified Mail (DKIM) and/or Sender Policy Framework (SPF) protocols. For example, SPF allows a domain owner to add a file or record on the server that the recipient server cross-checks. Similarly, DKIM may be used to embed information within the email. While these specific validation/authentication protocols are discussed herein, any known validation/authentication protocol may be used and the use of the DKIM/SPF protocol is used only to enhance the understanding of the reader by using a specific possible validation/authentication protocol.

Generally, SPF is an email validation system designed to detect email spoofing by providing a mechanism to allow receiving mail exchangers to check that incoming mail from a domain is being sent from a host authorized by that domain's administrators. The list of authorized sending hosts for a domain may be published in the Domain Name System (DNS) records for that domain in the form of a specially formatted TXT record. Sender Policy Framework is described in IETF publication RFC 7208, which is incorporated by reference as if fully set forth.

The Simple Mail Transfer Protocol (SMTP) permits any computer to send an email claiming to be from any source address. SPF allows the owner of an Internet domain to specify which computers are authorized to send email with sender addresses in that domain, using Domain Name System (DNS) records. Receivers verifying the SPF information in TXT records may reject messages from unauthorized sources before receiving the body of the message.

The sender address is transmitted at the beginning of the SMTP dialog. If the server rejects the sender, the unauthorized client should receive a rejection message, and if that client was a relaying message transfer agent (MTA), a bounce message to the original sending address may be generated. If the server accepts the sender, and subsequently also accepts the recipients and the body of the message, it should insert a Return-Path field in the message header in order to save the sender address.

Generally, DKIM is an email validation system designed to detect email spoofing by providing a mechanism to allow receiving mail exchangers to check that incoming mail from a domain is authorized by that domain's administrators. A digital signature included with the message may be validated by the recipient using the signer's public key published in the DNS. DKIM is the result of merging DomainKeys and Identified Internet Mail. Prominent email service providers implementing DKIM include Yahoo, Gmail, AOL and FastMail. Any mail from these organizations should carry a DKIM signature.

More specifically, both, signing and verifying modules are usually part of a mail transfer agent (MTA). The signing organization may be a direct handler of the message, such as the author, the originating sending site or an intermediary along the transit path, or an indirect handler such as an independent service that provides assistance to a direct handler. In most cases, the signing module acts on behalf of the author organization or the originating service provider by inserting a DKIM-Signature: header field. The verifying module typically acts on behalf of the receiver organization.

DKIM is independent of Simple Mail Transfer Protocol (SMTP) routing aspects in that it operates on the RFC 5322 message—the transported mail's header and body—not the SMTP envelope defined in RFC 5321. Hence, the DKIM signature survives basic relaying across multiple MTAs. DKIM allows the signer to distinguish its legitimate mail stream. This ability to distinguish legitimate mail from potentially forged mail has benefits for recipients of e-mail as well as senders, and "DKIM awareness" is programmed into some e-mail software.

The "DKIM-Signature" header field, by way of example, may include a list of "tag=value" parts. Tags are short, usually only one or two letters. The most relevant ones are b for the actual digital signature of the contents (headers and body) of the mail message, bh for the body hash, d for the signing domain, and s for the selector. The default parameters for the authentication mechanism are to use SHA-256 as the cryptographic hash and RSA as the public key encryption scheme, and encode the encrypted hash using Base64. The receiving SMTP server uses the domain name and the selector to perform a DNS lookup. For example, given the signature:

DKIM-Signature: v=1; a=rsa-sha256; d=example.net; s=brisbane;
c=relaxed/simple; q=dns/txt; l=1234; t=1117574938; x=1118006938;
h=from:to:subject:date:keywords:keywords;
h=MTIzNDU2Nzg5MDEyMzQ1Njc4OTAxMjMONTY 30DkwMTI=;
b=dzdVy0fAKCdLXdJ0c9G2q8LoXS1EniSbav-FyuU4zGeeruD00lszZ VoG4ZHRNiYzR.

A verifier queries the TXT resource record type of brisbane._domainkey.example.net. The selector is a straightforward method to allow signers to add and remove keys whenever they wish—long lasting signatures for archival purposes are outside DKIM's scope. Some more tags are visible in the example:

v is the version,
a is the signing algorithm,
c is the canonicalization algorithm(s) for header and body,
q is the default query method,
l is the length of the canonicalized part of the body that has been signed,
t is the signature timestamp,
x is it's expire time, and
h is the list of signed header fields, repeated for fields that occur multiple times.

The DKIM-Signature header field itself is always implicitly included in h.

The data returned from the verifier query is also a list of tag-value pairs. It includes the domain's public key, along with other key usage tokens and flags. The receiver may use this to then decrypt the hash value in the header field and at the same time recalculate the hash value for the mail message (headers and body) that was received. If the two values match, this cryptographically proves that the mail was signed by the indicated domain and has not been tampered with in transit.

Signature verification failure does not force rejection of the message. Instead, the precise reasons why the authenticity of the message may not be proven should be made available to downstream and upstream processes. Methods for doing so may include sending back a message, or adding an Authentication-Results header field to the message as described in RFC 7001, which is incorporated as if fully set forth.

While DKIM and SPF protocols are discussed herein, validation module 144 may perform any authentication and validation type protocols. DKIM and SPF are used to provide examples of such validation protocols that may be performed in validation module 144.

The notification HTTP module 146 delivers notices of events to external systems, such as an HTTP endpoint the vendor configures to update their internal database when a transaction is executed.

An email interface module 147 may be configured to parse emails for action by the e-commerce system 140.

The account management unit 148 is configured to manage accounts registered with the e-commerce system 140. A customer or vendor, wishing to complete a transaction with an e-commerce system 140 may register his/her email address and payment information with the e-commerce system 140. The account management unit 148 may be configured to store a customer registry and a vendor registry.

The security module 162 may be configured to perform additional security measures to prevent unauthorized access to the system or fraud.

The email service provider 170 may be associated with the vendor system 120, the e-commerce system 140, or may be a third party entity. The email service provider 170 may be configured to provide email marketing services. The email service provider 170 may further be configured to provide tracking information showing the status of email sent to each member of an address list. The email service provider 170 may further be configured to segment an address list into different interest groups or categories to send targeted information. The email service provider 170 may also parse messages based on the secondary system of email-targeted tokens. The email service provider 170 may also be configured to send trigger emails based on responses from the vendor system 120 or customer behavior. The email service provider 170 may further be configured to create or use templates generated by the e-commerce system 140. The templates may be used for sending information to contacts. Email service provider 170 may include a customer interface that allows a customer to adjust the template or it may be integrated with external sources (e.g. vendor system 120 or e-commerce system 140). The email service provider 170 may comprise a send engine (not shown), which allows vendors to distribute their message that may be received by one or more customer device(s) 150. The email service provider 170 may further include a tool for generating mailto links, graphic buttons, and tokens. The email service provider 170 may be configured to dynamically customize the content of emails that are sent out, to tailor personalized information and mailto links.

The banking server (not shown) may be controlled by a third party system bank. The e-commerce system 140 may communicate with the banking server to verify that the customer has adequate funds or credit for the requested payment. For example, the banking server may be a controlled by VISA, AMERICAN EXPRESS, MASTERCARD or any other banking or financial network that a customer may use for online payment. The banking server may be an automatic clearing house services (ACS). The banking server may be an interface for a centralized or decentralized virtual currency system or protocol such as frequent flyer miles, "reward" points, or Bitcoin.

The email-based e-commerce system 140 may allow vendors to send advertising emails or bills with a mailto link associated with a specific product offer (or payment amount) and select the mailto link and generate a response email by selecting the mailto link. This response email contains a token and is addressed to the e-commerce system 140. Once sent, this response email confirms the customer's payment for the product (or prepayment of a bill) by parsing the information in the token. The e-commerce system 140 processes the payment and notifies the vendor system 120 and the customer device 150. The e-commerce system 140 may comprise a token generator 141 as well as components for processing the tokens and components for processing the payments and a system for notifying the vendor system 120 of the transaction details.

The functionality of the offer, mailto link, and response email is described in U.S. Pat. No. 9,152,980 which issued on Oct. 6, 2015 entitled EMAIL-BASED E-COMMERCE, which is a continuation of U.S. Pat. No. 8,775,623 which issued on Jul. 8, 2014 entitled SYSTEM AND METHOD FOR EMAIL-BASED E-COMMERCE, and U.S. Pat. No. 9,058,591 which issued on Jun. 16, 2015 entitled EMAIL-BASED DONATIONS, which applications are incorporated by reference as if fully set forth.

Referring back to the example system in FIG. 1, the payment processing system 160 may be an independent third party operated unit, it may be located in the e-commerce system 140 or the vendor system 120.

While the example system shown in FIG. 1 shows the e-commerce system 140 comprising the token generator 141, this is shown as an example only. The vendor system 120 may also include a token generator 141 that allows vendors to directly create tokens. In another example, a third party may have a token generator 141 to create tokens for use by the vendor system 120.

System 100 may not require the vendor system 120 to host the token generator 141 on their system. System 100 uses the web browser's ability to transmit a message securely between two frames of a page and validating the URLs of those two pages.

Mailto links in the email messages may include one or any combination of the following fields: a "mailto:" and/or "to" field that indicate one or more email addresses of recipients of the new message; a "Copy To" or "CC" field that indicates one or more email addresses of recipients to whom a copy of the new message should be sent; a "Blind Copy To" or "BCC" field that indicates one or more email addresses of recipients to whom a "blind" copy of the new message should be sent; a field that indicates the subject of the new message; and a field that indicates the body of the new message. The mailto links may be defined according to the format described in Internet Engineering Task Force (IETF) RFC2368, which is incorporated by reference as if fully set forth herein. The mailto link may be accessed with a corresponding short URL.

The e-commerce system 140 may include a database of registered customers, such as for payment processing. The e-commerce system 140 may identify a customer by their email address and may decode tokens included in the content of an email and process payments based on the data in the token. A vendor that is associated with the e-commerce system 140 may send emails with the tokens generated for processing by the e-commerce system 140. When generating tokens, a related URL checkout page with a matching offer is generated. This allows vendors via vendor system 120 to send emails with payment options, including payments for product offers, donations, services and gift cards, for example, with each offer associated with a token and a URL checkout page. The token is associated with a mailto link. A customer may activate the mailto link by selecting (or "clicking on") the link and send the message to the e-commerce system 140. The e-commerce system 140 may then identify the email address and decode the token. If the e-commerce system 140 determines that the email address is not registered in the database, the e-commerce system 140 sends an email back to the customer with a URL link that is a checkout. This checkout is prepopulated based on the customer's mailto link selection based on the content of the token. The URL captures the payment information and registry information. The e-commerce system 140 updates the database once the new customer is registered. In future transactions, the email address of the customer is identified as registered by the e-commerce system 140 and the payment is processed exclusively through an email payment gateway.

An email-based e-commerce system 100, as described herein, allows an email payment opportunity. This may include an email advertisement offering a product or service which is sent to customers and contains one or more mailto links. Each mailto link may relate to an item (e.g. service or product). If the mailto link is selected by a customer, an email message associated with an item or items is generated. Within that generated email message is a token that includes encoded information such as the purchase amount, the merchant, or an item identifier. The information contained in the token includes details for both the completion of email transaction and details that provide context and direction for the process of completing a transaction when the details included within the token are not sufficient. This may include details about the composition of a page to collect more information from the customer (where the required fields and information about those fields are stored directly in the token), a pointer to a location where the composition of a page to collect more information is stored (where the required fields and information about these fields are indirectly referenced by data in this token for retrieval at a later time), or a pointer or description of a routine to execute in case of failures (e.g. a response email in the case of product unavailability). This mailto link may be generated by a vendor through a web interface tool, or by using the e-commerce system 100 to programmatically create either the token or the full mailto link.

For a customer to complete an email transaction, the customer's payment information may be contained in the email e-commerce system database 163. In order to determine if the customer's payment information is in database 163 the token may be decoded to recognize the customer when the email arrives at the e-commerce system 140. The vendor sends the first email via the vendor system 120. The customer via customer device 150 responds by activating a mailto link by sending the response to the e-commerce system 140. If the customer is registered and the incoming email is authenticated, when the token is decoded, the transaction is processed.

If the customer is not registered, a web checkout page may be needed. Additional information may be encoded within the email token that describes a web checkout page for the email offer. The vendor's email may thereby serve multiple purposes. One enables the email to perform as an email payment, if the customer is registered, and another enables the unregistered customer to be sent a web checkout 164. The web checkout 164 may be prepopulated with additional information based on the customers' original selection that is decoded from the token. The additional information included within the token identifies remote resources, which may include an input display and validation components. The remote resource may function as a plugin, as a reference to information stored in a database, or as a hook into the execution of an independent function.

When the web checkout 164 page is being loaded by the customer, the input display may provide the requirements for displaying the field on the form, including field name, entry box length, and other properties of the input field.

When the form has been filled out by the customer and is submitted, these form fields are sent to the validation resource to confirm that the information entered meets the formatting, length, data type, and any other requirements of the field. If validation resource returns a "pass" condition for the form, submission continues to the e-commerce system 140. If the validation resource returns a "fail" condition for any data on the form, error messaging may be displayed to the customer, to enable correction of the one or more particular inputs that were identified as incorrect and resubmission again.

These remote resources may be created to describe standard information that may be used across numerous merchants, or they may be used to define custom information that may be used for a single merchant.

Using this system 100, a vendor via vender system 120 may not be required to expend additional computer programming effort because it relies on the email e-commerce system 140. If the offer web page is linked to the email purchase opportunity, the vendor may not be required to modify any existing systems or processes to register customers with the email e-commerce system 140. The vendor may not need to segment their email lists into registered and unregistered customers and the customers are not aware of the distinction within the content of the email. The distinction between customers occurs by virtue of the system relieving both the vendor and the customer of any excess choices or distinctions. The vendor may create offers manually via a web interface, and the email e-commerce system 140 may handle the aspects of the transaction, from receiving the order request, facilitating the payment processing, storing relevant transaction data, sending a receipt, and displaying transaction data to the vendor.

The vendor may integrate directly with an API. The vendor may maintain existing payment flows separate from their email e-commerce solution, or the vendor may use the email e-commerce system as a full-featured payment system for both web and email transactions without doing any software development. Presenting the customer with a clear process that seamlessly migrates the customer to adopt an email-based checkout process eases the customer into a new technology where transactions happen by email instead of on a URL. This system 100 provides a vendor with a more automated or customized way of handling elements that may be achieved through the use of the email e-commerce system 140.

Figure 2:
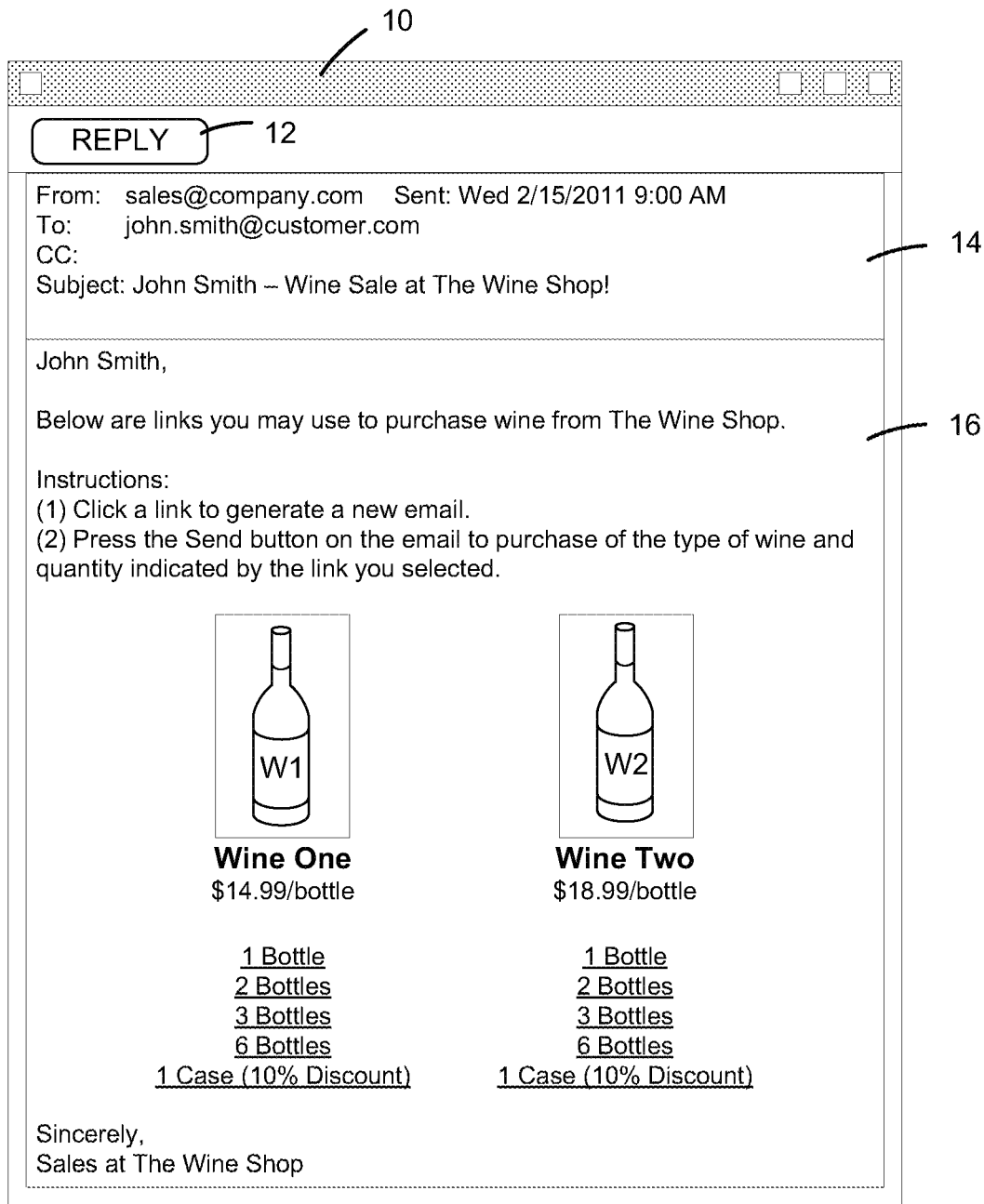
FIG. 2 illustrates an example advertisement email message that solicits the purchase of goods from a vendor system.

FIG. 2 illustrates an example email message that solicits the purchase of goods from a vendor. FIG. 2 shows an email display window 10 that may be used by the email client module of customer device 150 to display a first example email message from the message processing module. The email display window 10 may include a reply button 12, a control area 14, and a message body area 16. The control area 14 may display control and/or header information associated with the email message, such as the email addresses of the sender and recipient of the message. According to this example, the control area 14 shows that the sender of the message has the email address "sales@company.com." This is an email address that may be associated with an account used by the e-commerce system 140 for the communication of email messages. Further to this example, the control area 14 shows that the email address of the example recipient of the message (John Smith) is "john.smith@customer.com." The control area 14 may also display information such as a subject of the email message and the time the email message was sent. The reply button 12 may respond to user input to generate a new display element (not depicted) to respond to the email message.

The message body area 16 may display the body of the email message. As shown in FIG. 2, the message body area 16 may display an example email message that shows information related to two example products (Wine One and Wine Two) that are being offered for sale by an example vendor (The Wine Shop). The message body area 16 includes a picture of a bottle of each type of wine, as well as the price for a bottle of each type of wine. The message body area 16 also includes, under the picture of the bottle of Wine One, a number of mailto links, such as the "1 Bottle," "2 Bottles," "3 Bottles", "6 Bottles," and "1 Case (10 percent Discount)" links. The message body area 16 also includes similar links under the picture of the bottle of Wine Two. These links may be defined according to the mailto URI scheme or other appropriate format, and each may describe a new email message that may be generated by the email client module of customer device 150 when that link is selected.

The "1 Bottle" link beneath the picture of the Wine One bottle may include information that, if selected, generates an email message that, if received by the e-commerce system 140, will indicate to the e-commerce system 140 that John Smith may like to purchase one bottle of Wine One. As a further example, Wine One may have a product identifier of "0005," and John Smith may have a customer identifier of "0777." According to this example, the "1 Bottle" link may describe an email message that is addressed to an email account that is associated with the e-commerce system 140, and that includes a message body that includes the identifier for John Smith ("0777"), an identifier of the selected product ("0005"), and an identifier of the quantity that John Smith may like to order (in this example, a single bottle). Alternatively or additionally, the email message described by the link may include information such as text that describes the order, an identifier of the vendor (in this example, The Wine Shop), an email campaign identifier, and/or other information. Similarly, the "2 Bottles" link beneath the picture of the Wine One bottle may include information that describes an email message that, if received by the e-commerce system 140, will indicate to the e-commerce system 140 that John Smith may like to purchase two bottles of Wine One. According to this example, the "2 Bottles" link may be defined as follows:

<a href="mailto:sales@company.com?subject=Purchase percent 20 from percent 20 Wine percent 20 Shop percent 20 and body=You percent 20 have percent 20 created percent 20 an percent 20 order percent 20 for percent 20 two percent 20 bottles percent 20 of percent 20 Wine percent 20 One. percent 20 Press percent 20 the percent 20 Send percent 20 button percent 20 to percent 20 complete percent 20 the percent 20 order. percent OA percent OAProductID0005 percent 20 QualifierNA percent 20 Qty0002 percent 20 CustomerID0777 percent 20 CampaignID0003" 7 target="_blank">2 Bottles</a>mailto:sales@company.com?Subject="Press send to pay $42.99 to Wine Shop"? body="TEXT XXX-XXX-XXX-XXX"

In addition, the token identifier may be part of the To: address, or any other portion of an address field, or the address field itself. This token may be, for example, of the form: ex: mailto:payment-id-XXX-XXX-XXX@payments.atpay.com?Subject="Press send to pay $42.99 to Wine Shop"?body="TEXT". Once this token identifier reaches the e-commerce system 140, the e-commerce system 140 may perform a look-up of the actual token in order to parse the offer details. This process is described in greater detail below.

Similarly, the "3 Bottles," "6 Bottles," and "1 Case (10 percent Discount)" links beneath the picture of the Wine One bottle indicate corresponding information for three bottles, six bottles, and one case of bottles, respectively. Additionally, the "1 Bottle," "2 Bottles," "3 Bottles," "6 Bottles," and "1 Case (10 percent Discount)" links under the Wine Two bottle indicate corresponding information for Wine Two as that described above with respect to the mailto links relating to Wine One.

The email client module of customer device 150 may receive a user input that indicates that one of the links displayed in the message body area 16 is selected. The user input may be, for example, a mouse click, keyboard input, or any other type of input that indicates that a link is selected. The email client module of customer device 150 may, in response to this user input, generate and display an order email message as specified by the selected link.

Figure 3:
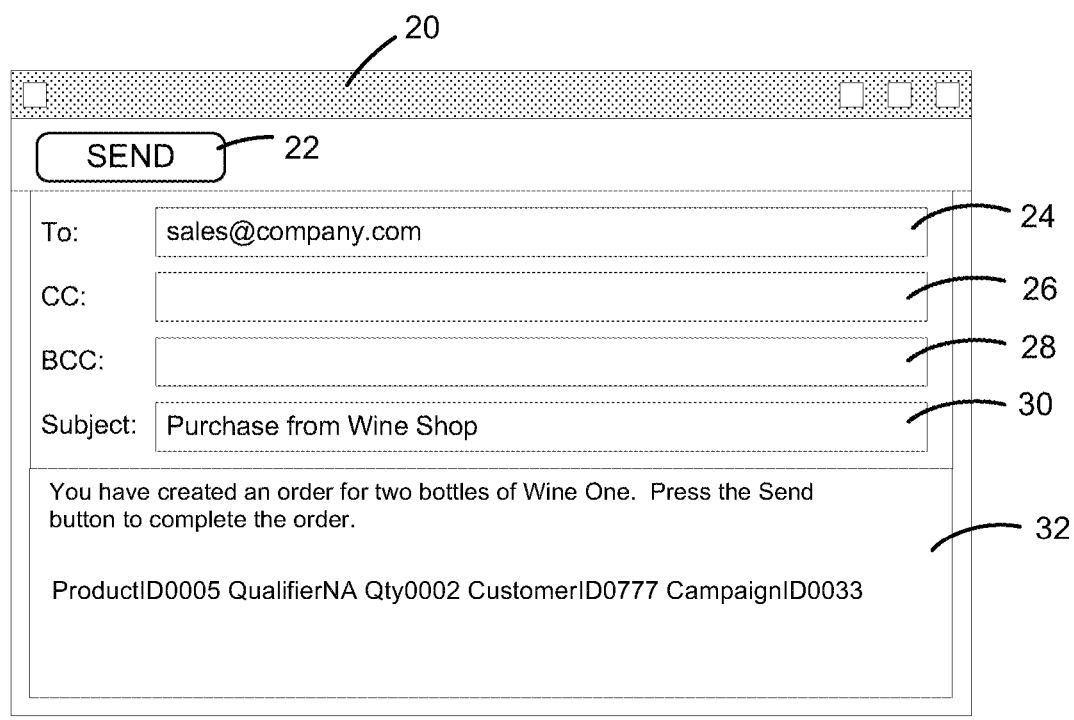
FIG. 3 illustrates a response email message for placing an order.

FIG. 3 illustrates an email message for placing an order. FIG. 3 shows an example message composition window 20 that may be displayed in response to a selection of a link from the message body area 16 of the email display window 10 of FIG. 2. The message composition window 20 of FIG. 3 may include a Send button 22, a To area 24, a CC area 26, a BCC area 28, a Subject area 30, and a message body area 32. The Send button 22 in the message composition window 20 of FIG. 3 may be responsive to input from a user such as a mouse click, keyboard input, or any other type of input. The different areas 24, 26, 28, 30, 32 in the message composition window 20 display different portions of an email message. For example, the To area 24 includes text that indicates email addresses to which the email message is addressed, while the message body area 32 displays the contents of the body of the email message. Each or any of these different areas 24, 26, 28, 30, 32 may be editable based on user input. Changes to the contents of these areas 24, 26, 28, 30, 32 may change the corresponding portion of the email message.

FIG. 3 shows an example wherein the "2 Bottles" link beneath the picture of the Wine One and described above with reference to FIG. 2 is selected. The To area 24 indicates that the message is addressed to sales@company.com. The Subject area 30 indicates that the subject of the message is "Purchase from Wine Shop." The CC area 26 and BCC area 28 are blank. Continuing the example of FIG. 3, Wine One product has a product identifier of "0005" and John Smith has a customer identifier of "0777." Accordingly, the message body area 32 includes the text "ProductID0005" and "CustomerID0777." To indicate that the user has selected the purchase of two bottles, the message body area 32 includes the text "Qty0002." Further, the message body area 32 includes the text "CampaignID0033," indicating that the order is associated with an email campaign with an identifier of "0033."

In an instance where a different link from the message body area 16 of FIG. 2 is selected, the display areas 24, 26, 28, 30, 32 in the message composition window 20 may include contents specified by the selected different link. For example, in an instance where a link related to Wine Two is selected, the message body area may not include the text "ProductID0005," but may include text that indicates the corresponding identifier for Wine Two.

Figure 4:
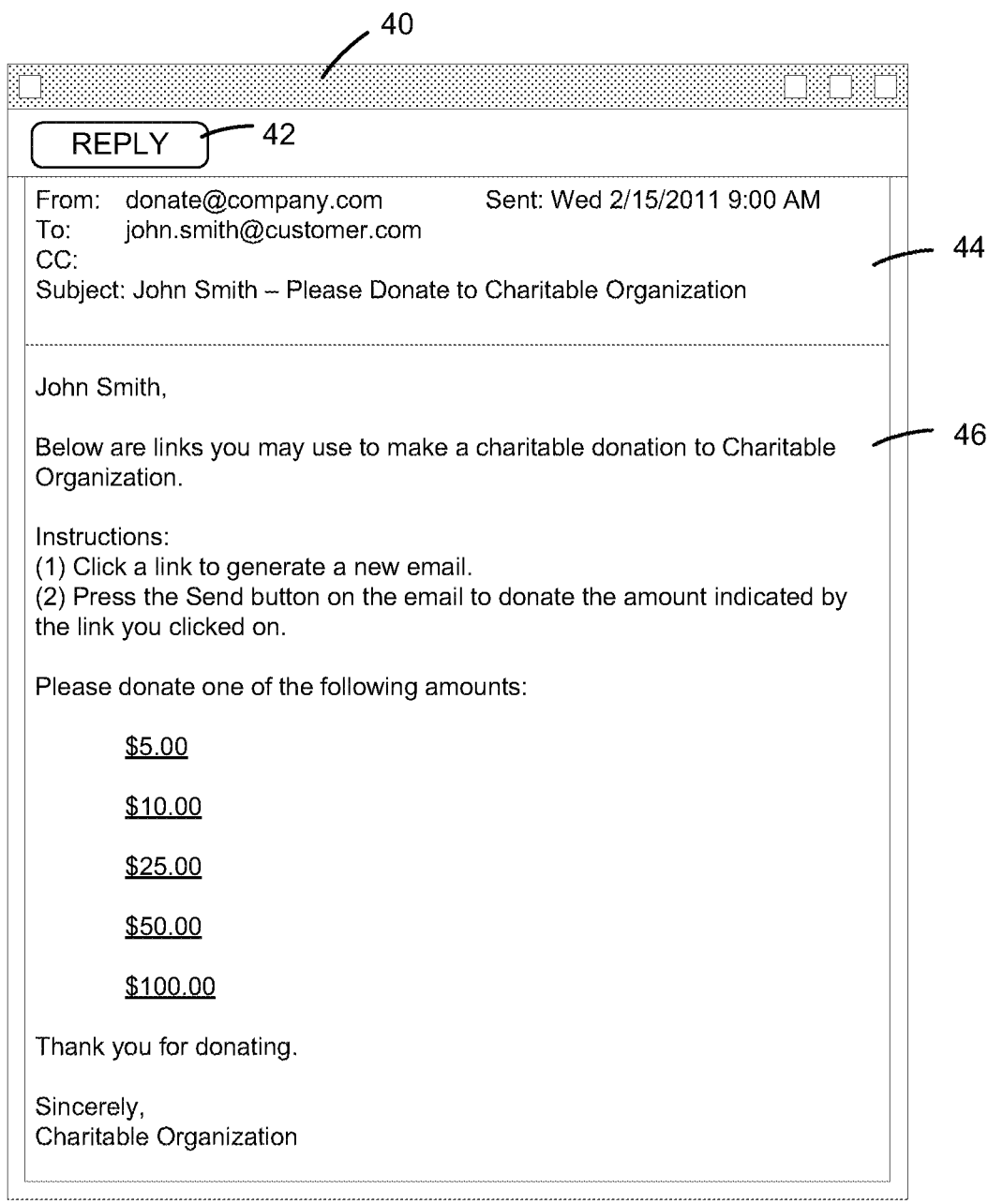
FIG. 4 illustrates an advertisement email message that solicits a donation.

FIG. 4 illustrates an advertisement email message that solicits a donation. FIG. 4 shows an email display window 40 that may be used by the email client module of customer device 150 to display a second example email message from the message processing module. The email display window 40 includes a Reply button 42, a control area 44, and a message body area 46. These display areas 42, 44, 46 may possess similar and/or analogous characteristics and/or perform similar functionality as corresponding display areas 12, 14, 16 in the message composition window 20 of FIG. 2. According to the example of FIG. 4, the control area 44 shows that the sender of the message has the email address "donate@company.com." This is an email address that may be associated with an account used by the e-commerce system 140 for the communication of email messages. Further to this example, the control area 44 shows that the email address of the example recipient of the message (John Smith) is "john.smith@customer.com."

As shown in FIG. 4, the message body area 46 of the email display window 40 may display an example email message that shows information related to the solicitation of donations for an example non-profit organization ("Charitable Organization"). The message body area 46 also includes mailto links, such as the "$5.00," "$10.00," "$25.00," "$50.00," and "$100.00" links. These links may possess similar and/or analogous characteristics, and/or include similar and/or analogous information, as the mailto links described above with reference to FIG. 2. The "$5.00" link describes an email message that, if received by the e-commerce system 140, will indicate to the e-commerce system 140 that John Smith may like to donate $5.00 to Charitable Organization. Similarly, the "$10.00," "$25.00," "$50.00, and $100.00" links describe email messages with corresponding information for $10.00, $25.00, $50.00, and $100.00 donations, respectively.

The email client module of customer device 150 may receive a user input that indicates that one of the links displayed in the message body area 46 is selected. The email client module of customer device 150 may, in response to this user input, generate and display an order email message as specified by the selected link.

Figure 5:
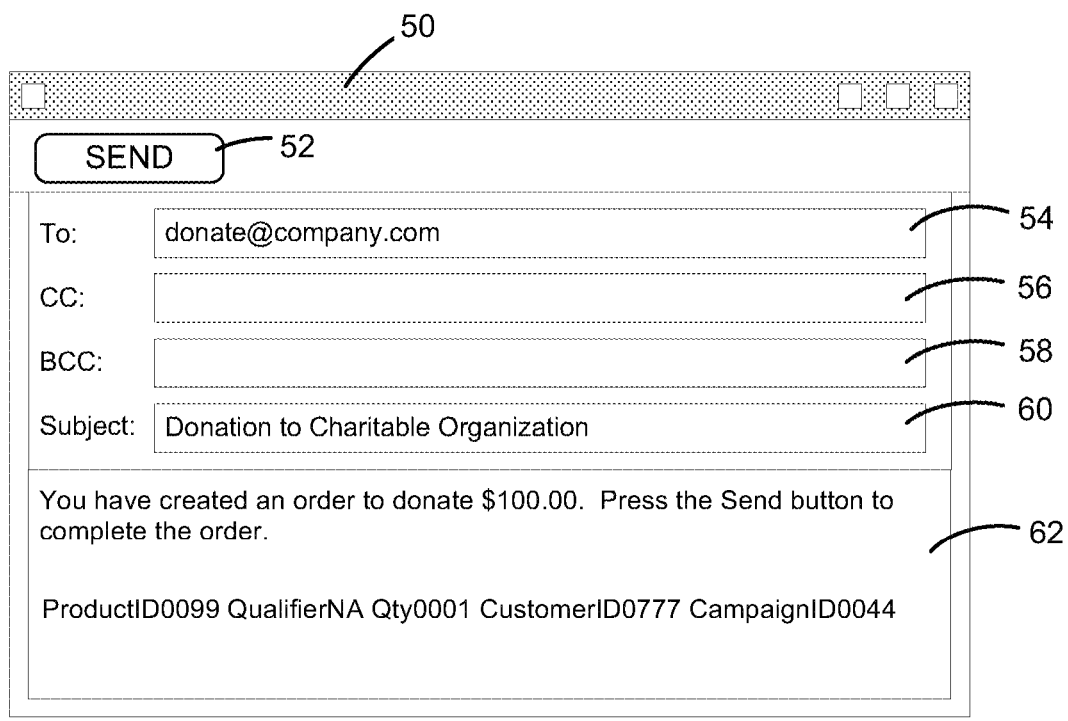
FIG. 5 illustrates a response email message for ordering a donation.

FIG. 5 illustrates an email message for ordering a donation. FIG. 5 shows an example message composition window 50 that may be displayed in response to a selection of a link from the message body area 46 of the email display window 40 of FIG. 3. The message composition window 50 of FIG. 5 may include a Send button 52, a To area 54, a CC area 56, a BCC area 58, a Subject area 60, and a message body area 62. These display elements 52, 54, 56, 58, 60, 62 may possess similar and/or analogous characteristics and/or perform similar functionality as corresponding display areas 22, 24, 26, 28, 30, 32 in the message composition window 20 of FIG. 3.

FIG. 5 shows an example wherein the "$100.00" link from the message body area 46 of the email display window 40 of FIG. 4 is selected. The To area 54 indicates that the message is addressed to donate@company.com. The Subject area 60 indicates that the subject of the message is "Donation to Charitable Organization." The CC area 56 and BCC area 58 are blank. According to this example, a donation of $100.00 to Charitable Organization has a product identifier of "0099," and John Smith has a customer identifier of "0777." Accordingly, the message body area 62 includes the text "ProductID0099" and "CustomerID0777." Further, the message body area 62 includes the text "CampaignID0044,"

indicating that the order is associated with an email campaign with an identifier of "0044."

The email client module of customer device 150 may send the generated order email message to the e-commerce system 140. This may be performed in response to input from a user of the customer device 150. As one example, the email client module of customer device 150 may, in response to a selection of the Send button 52 in the message composition window 50 of FIG. 5, transmit an order email message based on the contents of the fields 54, 56, 58, 60, 62 in the message composition window 50. As another example, the email client module of customer device 150 may, in response to a selection of the Send button 52 in the message composition window 50 of FIG. 5, transmit an order email message based on the contents of the display areas 54, 56, 58, 60, 62 in the message composition window 50.

As initially presented above, a token may be located within the To: Cc: or Bcc fields of a response email. This token may take the form of a short token, for example. The e-commerce system 140 may generate the short token that is located in the To: field, or any other field, for example, as part of the email address. When the vendor system 130 requests that the token generator 141 generate a mailto link with the identifiers and token, the token generator 141 may generate a "short lookup token" and the "long token" encoded with the identifiers. The short lookup token may be associated with the long token and may be required or otherwise needed to access the information in the long token index. The short token index may be sent in an email to the customer device 150 as a mailto link. The customer using the customer device 150 selects the mailto link and generates the response email addressed to the e-commerce system 140. The short lookup token may be built into the address of the response email. The short lookup token may be of the form: payment-id-74E4DE00-51E2-457B-8COB-648640EF232D@payments.atpay.com, for example.

When the customer using customer device 150 sends the email and the e-commerce system 140 receives the email and authenticates the customer's email address, the e-commerce system 140 may also determine using the short lookup token included in email address of the e-commerce system 140 the long token associated therewith. When the long token is determined, the e-commerce system 140 decodes the long token and processes the payment. The use of the short token allows for a less convoluted field in the email address and eliminates the need for the token to be located in the body field.

The short token lookup is not necessarily required in this system, as the transactions may be processed with the long token either in the address field, another field, or in the body of the response email. The use of the short lookup token may lessen the one-to-one correlation between the token and the actual offer and/or transaction details, as that correlation may be more direct in the long token embodiment.

Figure 6:
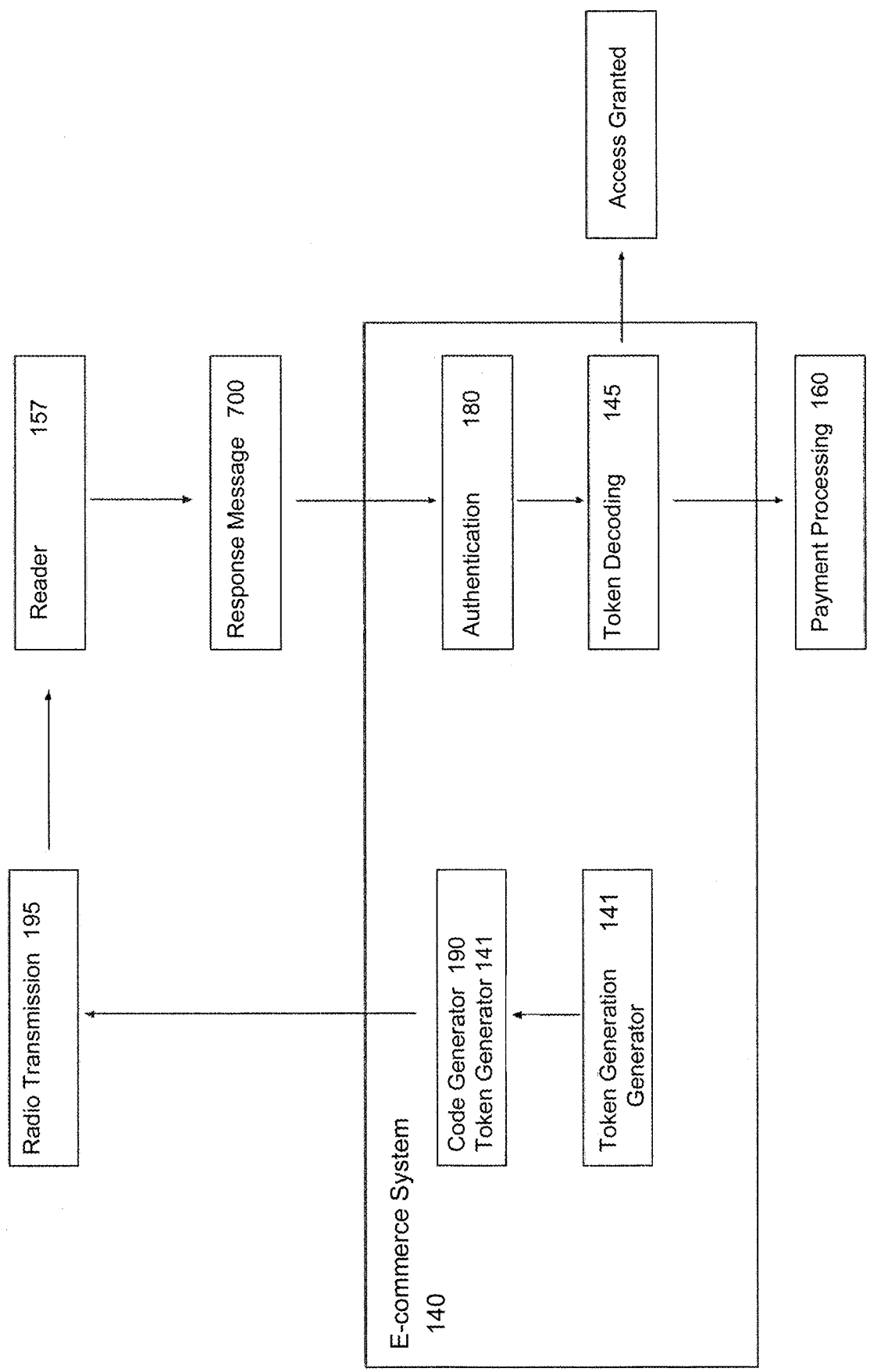
FIG. 6 is a diagram describing the cycle where the e-commerce system shares tokens for use in radio transmissions that generate response messages that are returned to the e-commerce system for processing.

FIG. 6 is a diagram describing the cycle where the e-commerce system 140 shares tokens for use in radio transmissions that generate response messages that are returned to the e-commerce system 140 for processing. The e-commerce system 140 generates tokens in the token generator 141 based on vendor's offers. Examples of offers may include an identification of the price the customer pays for a specific product, the customer's amount owed on an invoice or may be for granting access to a secure account. The tokens are coded into electronic chips and devices using the NFC code generator interface 190 and may be subsequently used by the vendor system 120. These chips or devices may be integrated into objects for example cards, keychains, price tags or mobile devices. The chip and/or device may be coded with the tokens using the NFC code generator interface 190 and the address of the e-commerce system 140. The vendor 120 may use the chip and/or device with transmissions 195 and reader technology 157 in a variety of ways. For example, the vendor 120 via e-commerce system 140 may encode chips with payment tokens that the customer uses their customer device 150 read, or alternatively, the vendor 120 may transmit and offer that is read by the NFC reader 157 of customer device 150.

Communication between the customer device 150 and the vendor 120 may be established in a variety of transmission forms including but not limited to radio, Bluetooth, and/or Wi-Fi among others and with a variety of devices. A variety of transmission distances and frequencies may be determined by vendor and customer requirements. Although NFC is used as an example herein to provide a clear explanation of the interaction, alternative industry names may be used such as RFID (Radio Frequency Identification).

The vendor 120 transmits signals which a reader 157 of customer device 150 detects and decodes. The customer device 150 generates a response message 700 using email client 156. Response message 700 may be sent to the e-commerce system 140. Response message 700 may include a token. Alternatively, or additionally, the message 700 may be an email but may be and SMS, HTTP or social media posting.

The e-commerce system 140 authenticates the message 700. The e-commerce system 140 authenticates 180 incoming messages and decodes tokens 145. When the messages 700 are authenticated 180 and tokens decoded 145 the e-commerce system 140 processes the payment using payment processing 160. Alternatively, the process used to grant access for payment processing may be used to grant access to secure account information.

Figure 7:
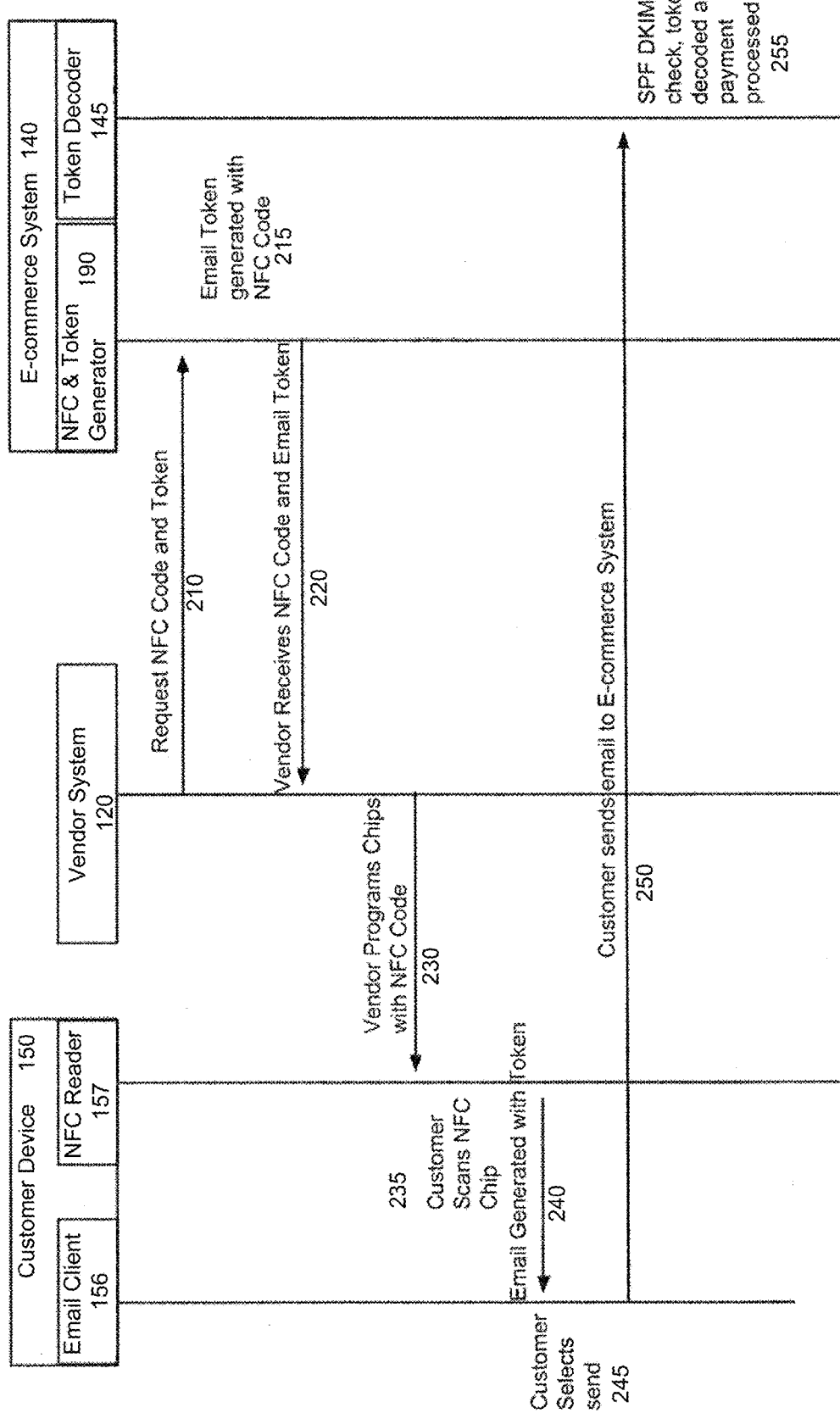
FIG. 7 illustrates a process using an NFC chip read by a reader on a customer device to open the email client and generate the response email.

FIG. 7 illustrates a process 200 using an NFC chip read by a reader 157 on a customer device 150 to open the email client 156 and generate the response email. In this example, the NFC chip may be in a price tag with a specific amount to be paid. The trigger may also come from another smartphone or device.

In process 200, the vendor system 120 requests an NFC code and email token at step 210 to be programed to an NFC chip or device. The e-commerce system 140 generates NFC code at step 215 using the NFC and token generator 190/141 that includes a token that corresponds with the offer and a mailto link that is addressed to the e-commerce system 140. The e-commerce system 140 shares the NFC code with the vendor 120 at step 220. The vendor 120 deploys the NFC code to an array of NFC chips and devices at step 230. A customer using a customer device 150, using an NFC reader 157, reads the chip at step 235 and, when the code is read, the email client 156 is opened and a response email is generated at step 240. The response email is addressed to the e-commerce system 140. The response email includes the token. The customer using the email client 156 of customer device 150 selects send at step 245 and sends the response email at step 250. When the e-commerce system 140 receives the email(s), the e-commerce system 140 authenticates the email and decodes the token and processes the payment at step 255. If the message is not authenticated, is missing information, lacks the required information, or does not have an account, the customer may be navigated to a signup page on the web-based checkout.

Alternatively or additionally when a customer with a customer device 150, using an NFC reader 157, reads the chip at step 235 and triggers the opening of a web browser and a page containing a selection of mailto links which when selected generates a response email at step 240.

Alternatively or additionally, rather than a selection of mailto links the web browser window may present an @Pay email based web checkout where the customer can edit the order and generate a total and then generate a response email.

Figure 8:
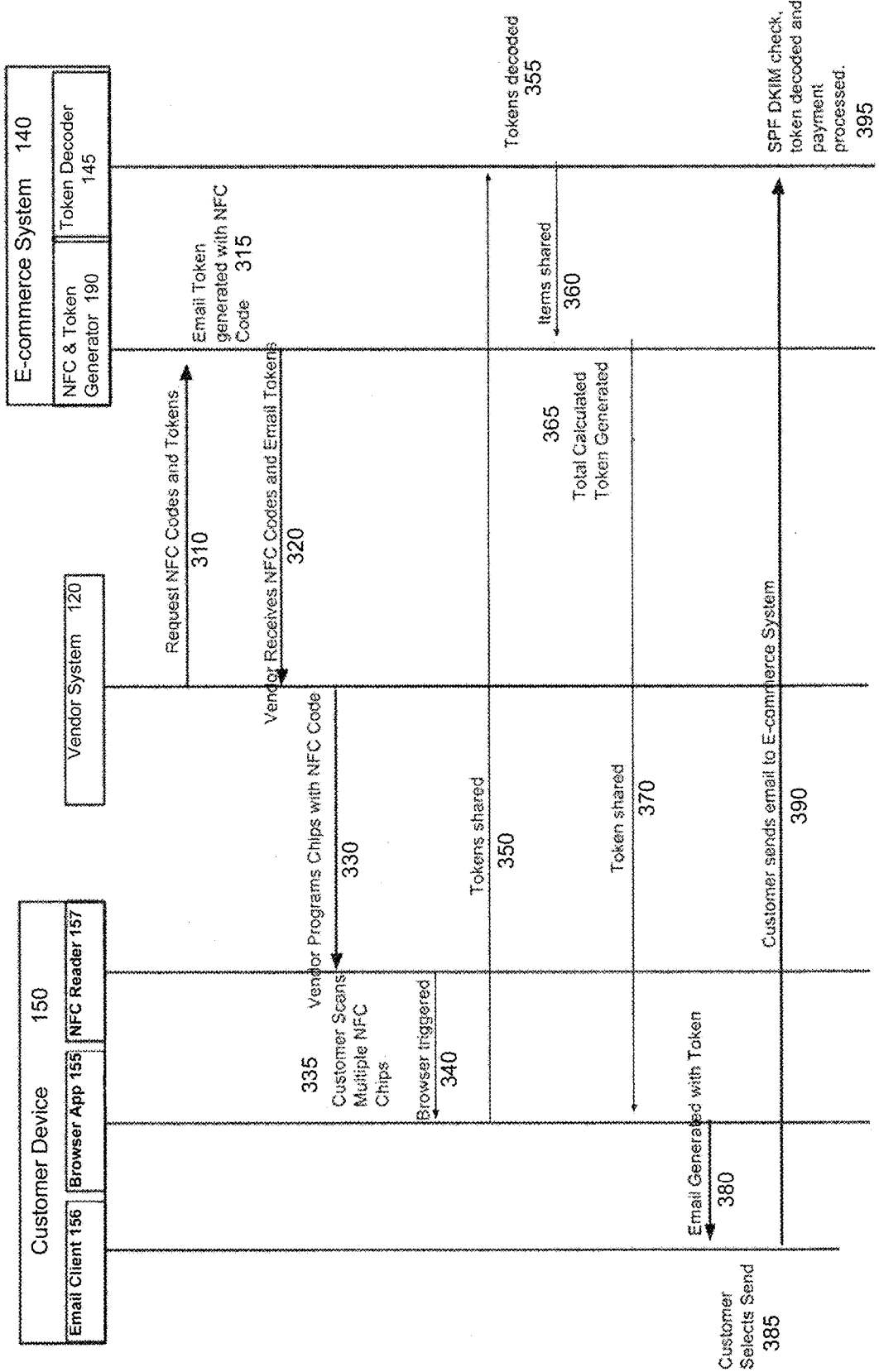
FIG. 8 illustrates a process using an NFC chip read by an NFC reader on a customer device to open a web URL on browser application as a means to total multiple items and open the email client and generate the response email.

FIG. 8 illustrates a process 300 using an NFC chip read by an NFC reader 157 on a customer device 150 to open a web URL on browser application 155 as a means to total multiple items and open the email client 156 and generate the response email. In this example the NFC chip may be in a series of price tags with a specific amount to be paid by the customer. The NFC trigger may also come from another smartphone or device.

In process 300, the vendor system 120 requests an NFC code and a token at step 310 for each offer and a URL address or email address of the e-commerce system 140 to be programed to an NFC chip or device.

The e-commerce system 140 generates NFC code at step 315 and the vendor system 120 receives the NFC code at step 320. The vendor system 120 may deploys the NFC code to an array of NFC chips and devices at step 330.

A customer with a customer device 150 may use an NFC reader 157 to read the chip at step 335 and when the code is read the web browser application 155 is opened at step 340. The web browser application 155 shares the token with the token decoder 145 of the e-commerce system 140 at step 350. Multiple chips may be read by a customer at step 335 and those tokens may be shared with the e-commerce system 140 via the web browser 155. The token decoder 145 decodes the tokens at step 355 and shares the information with the token generator 141 at step 360. The token generator 141 of the e-commerce system 140 calculates the total amount to be paid by the customer and generates a token for the total amount to be charged at step 365. The e-commerce system 140 shares the token with the web browser application 155 on customer device 150 at step 370. The token is embedded in a mailto link that includes the e-commerce system email address. The web browser unit 155 may display the total price and a mailto link. The mailto link may be embedded behind an image such as an image of a button and presented via the email client 156 at step 380. The customer selects the mailto link at step 385 and this triggers the email client application to open and generates the response email at step 390. When the e-commerce system 140 receives the email(s), the e-commerce system 140 authenticates the email and decodes the token and processes the payment at step 395. If the message is not authenticated, is missing information, lacks the required information, or does not have an account, the customer may be navigated to a signup page on the web-based checkout.

Alternatively, the response email may be automatically generated when the link is shared with the customer device 150 not requiring the customer to select a link. The response email is addressed to the e-commerce system 140 and holds the token. The token may be anywhere in the email. The customer sends the response email at step 385 and when the e-commerce system 140 receives the email at step 390, it authenticates the email and decodes the token and processes the payment at step 395. If the message is not authenticated, is missing information, lacks the required information, or does not have an account, the customer may be navigated to a signup page on the web-based checkout.

Alternatively or additionally access to a secure web page may be substituted for payment processing of step 395.

Alternatively or additionally the web browser 155 may be used in various ways to access offers. When a customer with a customer device 150, using an NFC reader 157, reads the chip at step 335 and when the code is read the code may trigger the opening of a web browser at step 340 and a page containing a selection of mailto links which when selected generates a response email.

Alternatively or additionally, rather than a selection of mailto links the web browser window may present an @Pay email-based web checkout where the customer may edit the order, enter additional information and generate a total and then generate a response email. The reader application may generate the total and submit a request for a token for that total amount.

Figure 9:
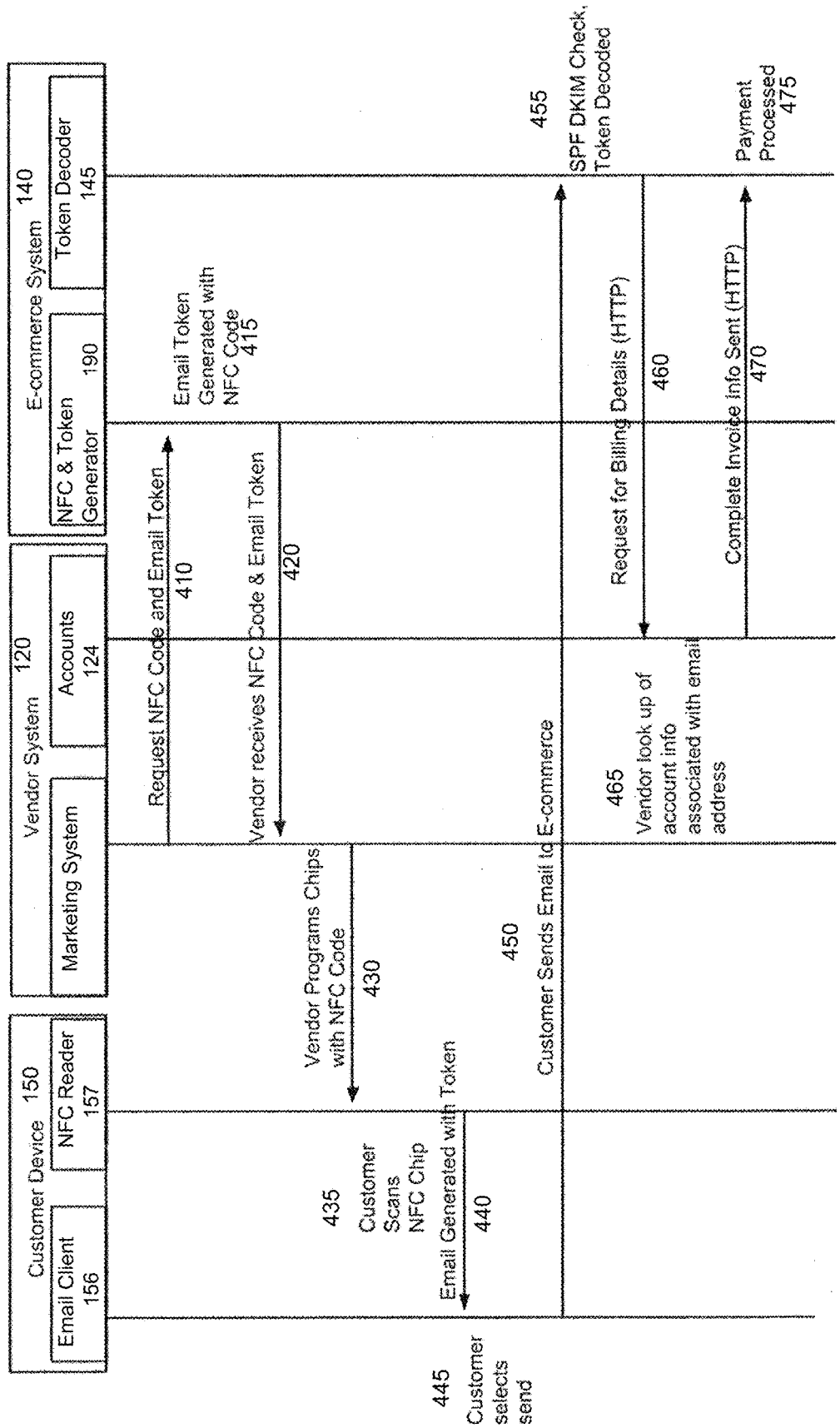
FIG. 9 illustrates a process that includes a generated response email with a lookup function to acquire information from the vendor that completes the required information for the payment to be processed.

FIG. 9 illustrates a process 400 that includes a generated response email but with a lookup function that completes the required information for the payment to be processed. In this example, the vendor (or third party) may hold details that are not on the chip. For instance, an advertisement that says "Pay Your Utility Bill By Email" may have a chip embedded but because each customer owes a different amount, the chip does not provide the amount in the reading of the chip. Further, the additional information may require entry of an account. For example, a bank may publish a chip that enables access to the bill pay system of the bank. Once the bill pay system of the bank is entered, the user may provide additional information regarding the account or accounts to which a payment is being made and even select the amount or amounts to be associated with the payment on each account.

In process 400, the vendor system 120 requests an NFC code and email token to be programmed to an NFC chip or device at step 420. The e-commerce system 140 generates NFC code using NFC and token generator 190/141 at step 415 that includes a token that corresponds with the offer and a mailto link that is addressed to the e-commerce system 140. The token may not provide all of the information to complete the transaction. The token may require a lookup but may not be 'missing' anything. The token may only hold part of the information and require a series of look ups to complete the transaction. The e-commerce system 140 shares the NFC code with the vendor 120 at step 420. The vendor 120 deploys the NFC code to an array of NFC chips and devices at step 430. A customer with a customer device 150, using an NFC reader 157, reads the chip at step 435 and this triggers the opening of the email client 156 and the generation of a response email addressed to the e-commerce system 140 with the email token at step 440. This email may not have details of the transaction. The customer selects send in the email client 156 of customer device 150 at step 445 and when the e-commerce system 140 receives the email at step 450, the e-commerce system 140 authenticates the email and decodes the toke at step 455. Alternatively only the email address may need to be authenticated it may serve as the token. The token is identified as requiring additional information.

The e-commerce system 140 requests from the vendor 120 any information required to complete the transaction at step 460. In this example, the e-commerce system 140 lookup requests the total amount due from the vendor 120. The vendor 120 using accounts 124 looks up the information associated with the email address at step 465. The vendor 120 shares the amount to be billed with the e-commerce system 140 at step 470 and the e-commerce system 140 processes the payment at step 475. If the message is not authenticated, is missing information, lacks the required information, or does not have an account, the customer may be navigated to a signup page on the web-based checkout.

Alternatively or additionally, the e-commerce system 140 may send a confirmation email with a mailto link and the amount to be charged. The customer using customer device 150 selects the link and generates a response email with a token which is addressed to the e-commerce system 140. The customer using customer device 150 selects send at step 445 and when the e-commerce system 140 receives the emails authenticates the email and decodes the token and processes the payment at step 475. If the message is not authenticated, is missing information, lacks the required information, or does not have an account, the customer may be navigated to a signup page on the web-based checkout.

Figure 10:
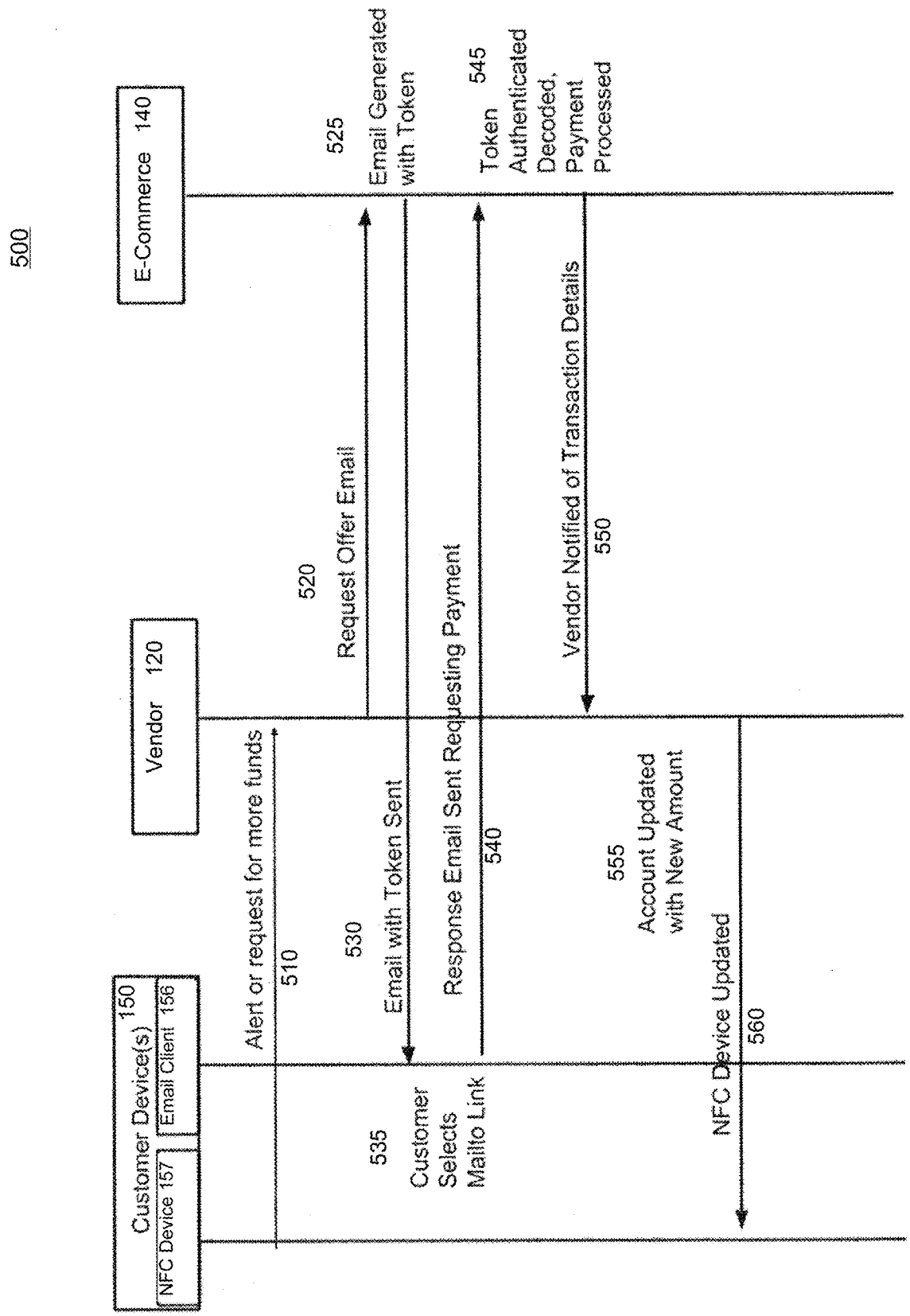
FIG. 10 illustrates a process in a system where the NFC chip holds an amount of money in an account and an email payment is authenticated and payment processed to increase the amount held in the customer account.

FIG. 10 illustrates a process 500 in a system where the NFC chip holds an amount of money in an account and an email payment is authenticated and payment processed to increase the amount held in the customer account. In this example, addressed NFC chips may carry an amount of money and may include a gift card or train fare card, for example.

Process 500 may include an account replenishing that occurs when the amount falls below a predetermined minimum. Customer device 150 may provide an alert or request for additional funds to vendor 120 at step 510.

In this scenario, the vendor 120 may request a payment email from the e-commerce system 140 at step 520. The e-commerce system 140 may generate at least one mailto link addressed to the e-commerce system 140 with a token at step 525. The generated mailto link including the token may be sent to the customer device 150 at step 530. The mailto link may be associated with the product, service or dollar amount that needs to be added to the account, for example. The email may have more than one mailto link listing a selection of amounts and products or services.

Alternatively, the message in step 530 may be delivered to the customer device 150 in any one or multiple ways, such as SMS (short message service), Social Media, barcode or Quick response code. Alternatively, the message sent in step 530 by the e-commerce system 140 may be sent by the vendor 120, for example.

After receiving the email, the customer using the email client 156 of the customer device 150 may select a mailto link at step 535. Once selected, the email client 156 of customer device 150 may send a response email requesting payment to e-commerce system 140 at step 540. When the e-commerce system 140 receives the emails authenticates the email and decodes the token and processes the payment at step 545. If the message is not authenticated, is missing information, lacks the required information, or does not have an account, the customer may be navigated to a signup page on the web-based checkout. Once the payment is processed, e-commerce system 140 may notify the vendor 120 of the transaction details at step 550. The vendor 120 may update the customer's account with the new information from the transaction at step 555. The vendor 120 may then update the NFC device 157 of customer device 150 at step 560.

FIG. 11 is an example of the email offer message 600 of step 530 sent from the e-commerce system 140 to the customer device 150. The mailto link with token may be embedded behind an image 610. In this example message 600, there is an image of a button 610. The customer using customer device 150 selects the mailto link (button 610) and generates a response email addressed to the e-commerce system 140 within email client 156.

Figure 12:
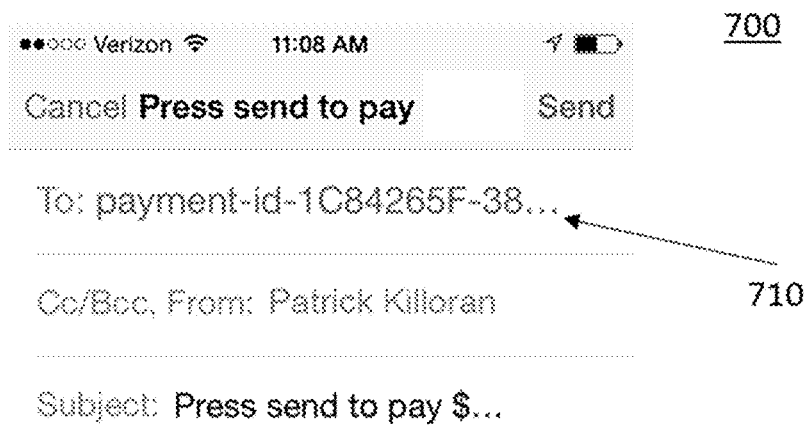
FIG. 12 is an example of a response message with token sent from customer device to e-commerce system.

FIG. 12 is an example of a response message 700 with token of step 540 sent from customer device 150 to e-commerce system 140. In this example message 700, the token is integrated into the address field 710. The token may be placed anywhere in the email as described above.

The above disclosure may use bulk tokens or the e-commerce system's email address may be used for more than one customer. Alternatively or additionally the above invention may use an NFC chip or device that is that triggers an email address and token that is unique to that chip or device and to the customer's email address.

Also disclosed is a design where an NFC credit card or magnetic strip credit card, where the customer may register for the email payment gateway by using a device that reads the NFC chip or allows the customer to swipe their credit card and entering their email address and completes the transaction. This allow a customer at a point of sale to complete a transaction in a store or other site and register for the email based payments using the email payment gateway.

Also disclosed is the use of an NFC credit card or magnetic strip credit card at a terminal allowing registered customers transactions to be processed using email address, password, and/or an additional code specific to the card or other cross referencing within the card email message.

Also disclosed are uses for the NFC where the NFC chip is used for extra security to access devices where email payments are initiated. A customer's device may have an application such as an email client that requires the reading of an NFC chip in order to open the application. This chip could be integrated with an existing credit card.

The system described herein is only one version of the system and method and the invention is not limited to this configuration. Certain processes may be located in different areas. The use of chips and their devices may be used in multiple ways to produce transmissions of the required information. Other chips used in card technology, for example EMV chips, may work in concert with radio wave transmission technology described above. Other chips used in card technology, for example MEMS Microelectromechanical Systems, may work in concert with radio wave transmission technology described above. The design of the NFC chip and device may be exclusive to the e-commerce system either allowing for greater functionality, scalable outcomes or security.

It should be understood that many variations are possible based on the disclosure herein. Although features and elements are described above in particular combinations, each feature or element may be used alone without the other features and elements or in various combinations with or without other features and elements.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for improving security of an e-commerce transaction, the method comprising:
    generating, by an e-commerce system, a token for the e-commerce transaction;
    generating, by the e-commerce system, an embedded link that generates a webpage that contains a selection of mailto links, wherein each of the selection of the mailto links when activated generates a respective response email that contains the token and identifies which of the selection of the mailto links was activated;
configuring, by the e-commerce system, a Near-Field-Communication (NFC) code to include the embedded link;
transmitting, by the e-commerce system, the NFC code to a vendor server;
receiving, by the e-commerce system, a response email from an email address of a sender of the response email, wherein the response email is generated based on an activation of a particular mailto link from the selection of the mailto links the;
decoding, by the e-commerce system, the token to form a decoded token;
validating, by the e-commerce system, the decoded token;
identifying, by the e-commerce system, the e-commerce transaction based on the decoded token and the particular mailto link activated;
performing, by the e-commerce system, an authentication of the email address of the sender, wherein the authentication includes at least one of Sender Policy Framework (SPF) validation or DomainKeys Identified Mail (DKIM) validation; and
processing, by the e-commerce system, the e-commerce transaction identified based on the authentication of the email address of the sender and the validating of the decoded token.

2. The method of claim 1, wherein the webpage is generated using a Uniform Resource Locator (URL).

3. The method of claim 1, further comprising:
transmitting, by the e-commerce system, a request for billing details; and
receiving, by the e-commerce system, the billing details in response to the transmitting,
wherein the e-commerce transaction is processed using the billing details.

4. The method of claim 3 wherein the billing details provide additional information for completing the e-commerce transaction.

5. A system that improves security of an e-commerce transaction, the system comprising:
a communication interface that is communicatively coupled to a vendor server via a communication network;
a memory;
a processor communicatively coupled to the memory and the communication interface, wherein the processor is configured to:
receive, using the communication interface, a request from the vendor server,
generate, in response to receiving the request, a token for the e-commerce transaction,
generate, in response to generating the token, an embedded link that generates a webpage that contains a selection of mailto links, wherein each of the selection of the mailto links when activated generates a respective response email that contains the token and identifies which of the selection of the mailto links was activated;
configure, in response to receiving the request, a Near-Field-Communication (NFC) code to include the embedded link,
transmit, using the communication interface, the NFC code to the vendor server,
receive, using the communication interface a response email, wherein the response email is generated from an activation of a particular mailto link from the selection of the mailto links the, and
in response to receiving the response email:
decode the token to form a decoded token;
validate the decoded token to generate a validation result;
identify the e-commerce transaction based on the decoded token and the particular mailto link activated;
perform an authentication of an email address of a sender of the response email, wherein the authentication includes at least one of Sender Policy Framework (SPF) validation or DomainKeys Identified Mail (DKIM) validation of the response email; and
process the e-commerce transaction based on the validation and the validation result.

6. The system of claim 5 wherein the webpage is generated using a Uniform Resource Locator (URL).

7. The system of claim 5, wherein the processor is further configured to:
transmit, using the communication interface, a request for billing details; and
receive, using the communication interface, the billing details in response to the request,
wherein the e-commerce transaction is processed using the billing details.

8. The system of claim 7 wherein the billing details provide additional information for completing the e-commerce transaction.

9. The system of claim 5 wherein the token is generated based on an amount of the e-commerce transaction.

10. A non-transitory computer readable storage medium that stores instructions for improving security of an e-commerce transaction, the instructions when executed by a processor of an e-commerce system cause the processor to execute a method, the method comprising:
generating a token for the e-commerce transaction;
generating an embedded link that generates a webpage that contains a selection of mailto links, wherein each of the selection of the mailto links when activated generates a respective response email that contains the token and identifies which of the selection of the mailto links was activated;
configuring a Near-Field-Communication (NFC) code to include the embedded link;
transmitting, via a communication interface, the NFC code a vendor server;
receiving, via the communication interface, a response email from an email address of a sender of the response email, wherein the response email is generated based on an activation of a particular mailto link from the selection of the mailto links;
decoding the token to form a decoded token;
validating, by the e-commerce system, the decoded token;
identifying the e-commerce transaction based on the decoded token and the particular mailto link activated;
performing an authentication of the email address of the sender of the response email, wherein the authentication includes at least one of Sender Policy Framework (SPF) validation and DomainKeys Identified Mail (DKIM) validation; and
processing the e-commerce transaction identified based on the authentication of the email address and the validating of the decoded token.

11. The non-transitory computer readable storage medium of claim 10, wherein the webpage is generated using a Uniform Resource Locator (URL).

12. The non-transitory computer readable storage medium of claim 10, wherein the method further comprises:

transmitting, by the e-commerce system, a request for billing details; and receiving, by the e-commerce system, the billing details in response to the transmitting, wherein the e-commerce transaction is processed using the billing details.

13. The non-transitory computer readable storage medium of claim 12, herein the billing details provide additional information for completing the e-commerce transaction.

\* \* \* \* \*